(12) United States Patent
Shao

(10) Patent No.: US 10,432,860 B2
(45) Date of Patent: Oct. 1, 2019

(54) CAMERA OPERATION MODE CONTROL

(71) Applicant: Lenovo (Beijing) Co., Ltd., Beijing (CN)

(72) Inventor: Xin Shao, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/486,626

(22) Filed: Apr. 13, 2017

(65) Prior Publication Data
US 2017/0374284 A1    Dec. 28, 2017

(30) Foreign Application Priority Data

Jun. 27, 2016  (CN) .......................... 2016 1 0483664

(51) Int. Cl.
H04N 5/232    (2006.01)
H04N 7/18    (2006.01)

(52) U.S. Cl.
CPC ......... H04N 5/23245 (2013.01); H04N 7/185 (2013.01); H04N 7/188 (2013.01)

(58) Field of Classification Search
CPC .. H04N 5/23245; H04N 7/188; H04N 1/4413; H04N 1/4486; H04N 5/2324; H04N 7/185; G07C 9/00142; G02B 7/34
See application file for complete search history.

(56) References Cited

U.S. PATENT DOCUMENTS

| | | | | |
|---|---|---|---|---|
| 6,433,818 | B1* | 8/2002 | Steinberg | ........... G07C 9/00142 348/161 |
| 2004/0207743 | A1* | 10/2004 | Nozaki | .............. H04N 5/23212 348/333.12 |
| 2011/0205155 | A1* | 8/2011 | Newton | .................. G06F 3/011 345/157 |
| 2012/0105482 | A1 | 5/2012 | Xu | |
| 2013/0015946 | A1* | 1/2013 | Lau | .......................... G07C 9/00 340/5.2 |
| 2015/0116544 | A1 | 4/2015 | Xu et al. | |
| 2015/0286340 | A1* | 10/2015 | Send | ....................... G01S 17/46 345/175 |
| 2016/0037110 | A1* | 2/2016 | Choi | ...................... H04N 5/378 348/294 |

FOREIGN PATENT DOCUMENTS

| | | |
|---|---|---|
| CN | 101197665 A | 6/2008 |
| CN | 102754047 A | 10/2012 |
| CN | 103558981 A | 2/2014 |
| CN | 104104871 A | 10/2014 |
| CN | 104331124 A | 2/2015 |
| CN | 104331149 A | 2/2015 |
| CN | 104571604 A | 4/2015 |
| CN | 104586364 A | 5/2015 |
| CN | 105159437 A | 12/2015 |
| CN | 105407287 A | 3/2016 |

* cited by examiner

*Primary Examiner* — Ahmed A Berhan
(74) *Attorney, Agent, or Firm* — Anova Law Group, PLLC

(57) ABSTRACT

A controlling method includes obtaining a triggering event and controlling, based on the triggering event, a camera of an electronic apparatus to be in an operation mode corresponding to the triggering event. The triggering event is one of a plurality of types of events. The plurality of types of events include a first-type event and a second-type event that are different from each other.

13 Claims, 5 Drawing Sheets

(a)

(b)

CAMERA OPERATION MODE CONTROL

CROSS-REFERENCE TO RELATED APPLICATION

This application claims priority to Chinese Patent Application No. 201610483664.7, filed on Jun. 27, 2016, the entire contents of which are incorporated herein by reference.

TECHNICAL FIELD

The present disclosure relates to the electronics technology and, more particularly, to a method and device for controlling the operation modes of a camera, and an electronic apparatus.

BACKGROUND TECHNOLOGIES

Camera, as a video input or acquiring apparatus, has become part of the basic configuration of an electronic apparatus, such as a smart phone, a tablet, or a laptop. With increasing of the resolution, cameras on electronic apparatuses now can capture photos or videos having a comparable quality to those captured by conventional portable cameras and even to those captured by low-end single-lens reflex cameras.

In conventional technologies, an electronic apparatus may include one or more than one cameras, but each camera may be used for limited purposes. For example, a built-in camera of an electronic apparatus is usually only used to capture pictures, e.g., a front camera is only used to take selfies and a rear camera is only used to take landscape photos or portraits.

SUMMARY

In accordance with the disclosure, there is provided a controlling method including obtaining a triggering event and, based on the triggering event, controlling a camera of an electronic apparatus to be in an operation mode corresponding to the triggering event. The triggering event is one of a plurality of types of events. The plurality of types of events include a first-type event and a second-type event that are different from each other.

Also in accordance with the disclosure, there is provided an electronic apparatus including a camera and a processor coupled to the camera. The processor obtains a triggering event and, based on the triggering event, controls the camera to be in an operation mode corresponding to the triggering event. The triggering event is one of a plurality of types of events. The plurality of types of events include a first-type event and a second-type event that are different from each other.

Also in accordance with the disclosure, there is provided a controlling device including a processor and a memory coupled to the processor. The memory stores instructions that, when executed by the processor, cause the processor to obtain a triggering event and, based on the triggering event, control a camera of an electronic apparatus to be in an operation mode corresponding to the triggering event. The triggering event is one of a plurality of types of events. The plurality of types of events include a first-type event and a second-type event that are different from each other.

DESCRIPTION OF EMBODIMENTS

Hereinafter, embodiments will be described with reference to the drawings, which are merely examples for illustrative purposes and are not intended to limit the scope of the disclosure. Wherever possible, the same reference numbers will be used throughout the drawings to refer to the same or like parts.

Embodiments include a controlling method and a controlling device for controlling camera operation modes, and an electronic apparatus implementing the method and/or the device. In the disclosure, the electronic apparatus can be any apparatus having the information processing capability, such as a mobile phone, a tablet, a laptop, a personal computer, a personal digital assistant, a navigator, a digital phone, a video phone, or a television, and can include at least one built-in camera and a processor. In some embodiments, the processor, e.g., a central processing unit or a camera controller, of the electronic apparatus can perform the controlling method by, for example, executing instructions in the form of program codes. The program codes can be stored in a memory, e.g., a non-transitory computer-readable storage medium. The controlling device can include at least the processor and the memory.

Figure 1A:
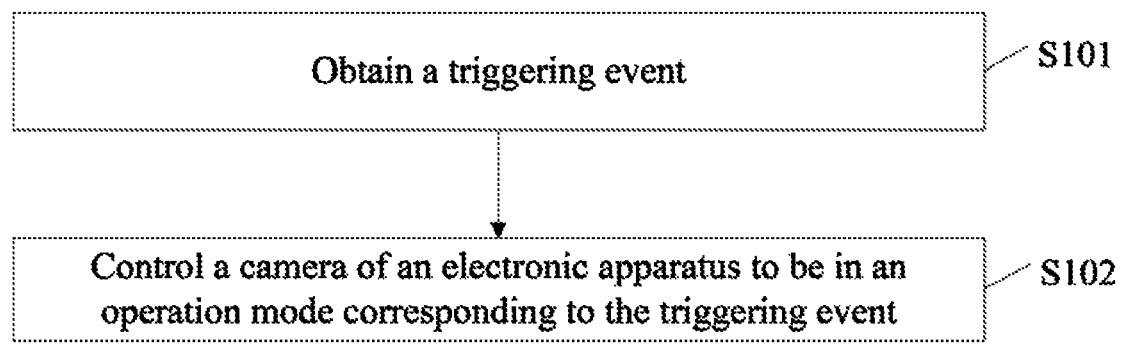
FIG. 1A is a flow chart of an example of camera operation mode control method consistent with embodiments of the disclosure.

FIG. 1A is a flow chart of an example of camera operation mode control method consistent with some embodiments. As shown in FIG. 1A, at S101, a triggering event is obtained. At S102, the camera of the electronic apparatus is controlled, based on the triggering event, to be in an operation mode corresponding to the triggering event. In some embodiments, controlling the camera to be in an operation mode may refer to controlling the camera to enter the operation mode corresponding to the triggering event if the camera is in another operation mode or in an idle state, or to maintain the operation mode if the camera is already working in the operation mode corresponding to the triggering event. If the triggering event is a first-type event, the camera is controlled to be in a texture acquiring mode. On the other hand, if the triggering event is a second-type event, the camera is controlled to be in a picture acquiring mode. The first-type event and the second-type event are different from each other.

Generally, an electronic apparatus, e.g., a mobile phone, may include a built-in cameras arranged on or in the electronic apparatus, and/or may be coupled to an external, independent camera through a cable or an interface. An external camera is usually more powerful than a built-in camera. Further, using an external camera instead of a built-in camera may reduce the weight of the electronic apparatus. An electronic apparatus consistent with some embodiments includes a built-in camera. In some embodiments, the electronic apparatus can include one or more cameras.

Figure 1B:
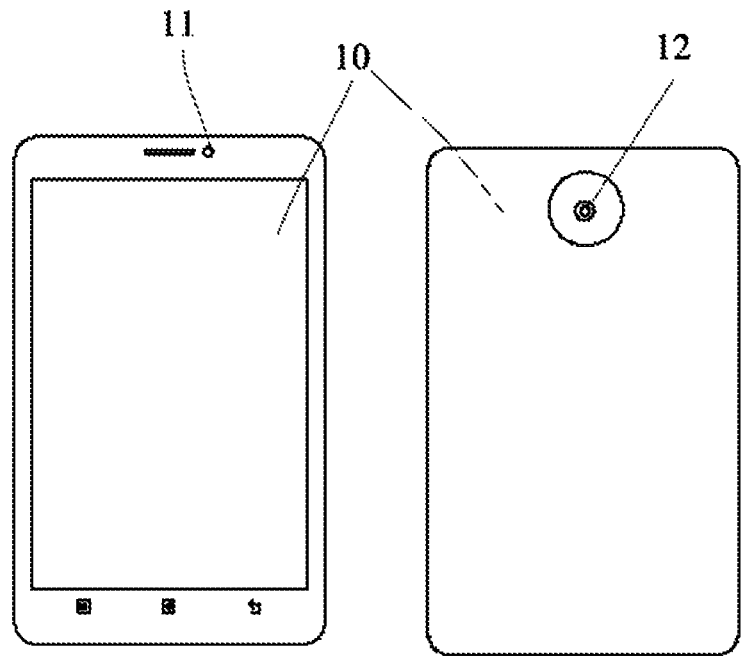
FIG. 1B schematically shows a mobile phone consistent with embodiments of the disclosure.

FIG. 1B schematically shows a mobile phone 10 as an example of the electronic apparatus consistent with some embodiments. As shown in FIG. 1B, the mobile phone 10 includes a front camera 11 and a rear camera 12.

Figure 1C:
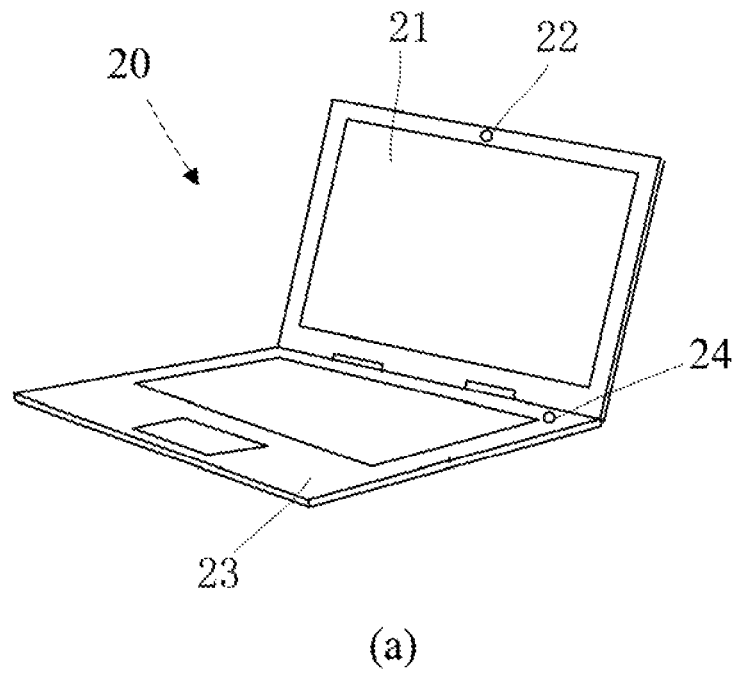
FIG. 1C schematically shows a laptop consistent with embodiments of the disclosure.
Figure 1C:
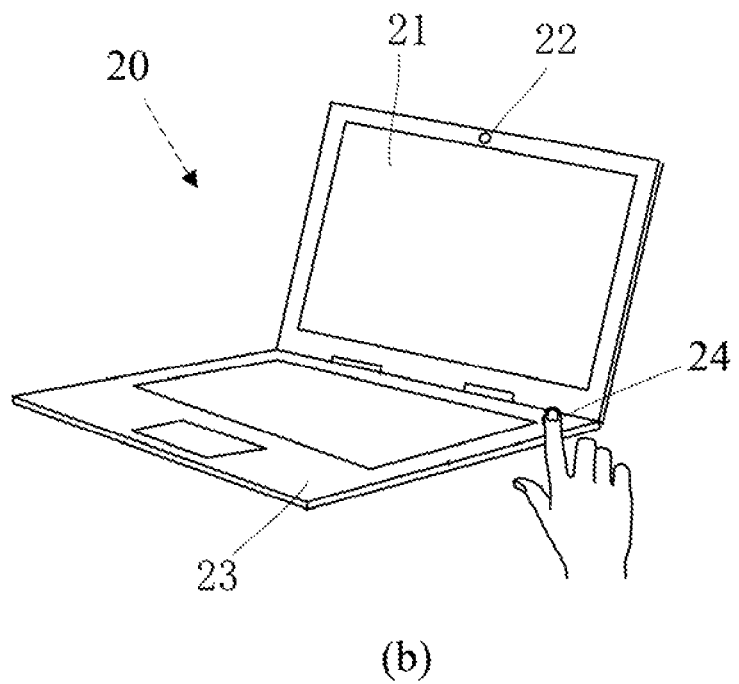

The electronic apparatus consistent with some embodiments can also be a laptop. A housing of the laptop includes four faces, labeled as face A, face B, face C, and face D, respectively. Face A refers to the face at the top of the laptop, usually bearing a logo of the laptop. Face B refers to the face of the laptop on which a screen is arranged. Face C refers to the face of the laptop on which a keyboard is arranged. Face D refers to the face at the bottom of the laptop, i.e., a bottom cover of the laptop, which can be seen when the laptop is turned over. A bottom plate is arranged on face D. When the bottom plate is removed, the hardware components inside the laptop can be seen. Usually, a laptop includes one built-in camera mounted, for example, on face B, but some laptops may include two cameras. FIG. 1C schematically shows a laptop 20 as another example of the electronic apparatus consistent with some embodiments. As shown in FIG. 1C, the laptop 20 includes a face B 21 having a first camera 22 arranged thereon and a face C 23 having a second camera 24 arranged thereon. Panels (a) and (b) in FIG. 1C shows the status in which no finger touches the second camera 24 and the status in which a finger touches the second camera 24, respectively.

In some embodiments, the triggering event can be one of at least two types of event, i.e., as described above, the first-type event and the second-type event. In some embodiments, if the electronic apparatus determines that the obtained triggering event is the first-type event, the electronic apparatus controls its camera to be in the texture acquiring mode. On the other hand, if the triggering event obtained by the electronic apparatus is the second-type event, the electronic apparatus controls its camera to be in the picture acquiring mode.

In some embodiments, the first-type event can include an identity authentication event, such as an account login event, and the second-type event can include a picture capturing event. The triggering event can be a triggering instruction obtained by obtaining an operation of the user. For example, when the user starts/turns on the camera, the electronic apparatus detects the operation of turning on the camera by the user and thus obtains the triggering event. As described above, the second-type event can include a picture capturing event. Therefore, because the obtained triggering event is an event involving an operation of the user to turn on the camera for capturing pictures, the triggering event thus obtained can be determined to be a second-type event. On the other hand, the triggering event can be another event, such as the account login event, e.g., a user logging in to an email account, logging in to a social App, logging in to an operation system such as the Microsoft Windows system. If the electronic apparatus detects the account login event, the electronic apparatus can determine the triggering event is a first-type event.

In some embodiments, the camera being in the texture acquiring mode refers to that the camera can acquire a texture, such as a finger print of the user, to obtain a texture image. Further, the camera being in the picture acquiring mode refers to that the camera can acquire a picture, such as a picture of an object, e.g., a landscape or a person, to obtain an object image.

In some embodiments, obtaining the triggering event includes monitoring whether the account login event has occurred and, if so, obtaining the first-type event. In some other embodiments, obtaining the triggering event includes detecting a camera-starting operation performed by the user and, in response to the camera-starting operation, obtaining the second-type event.

Consistent with some embodiments of the disclosure, the triggering event can be obtained and the camera of the electronic apparatus can be controlled to be in the operation mode corresponding to the triggering event. If the triggering event is the first-type event, the camera can be controlled to be in the texture acquiring mode. If the triggering event is the second-type event, the camera can be controlled to be in the picture acquiring mode. The first-type event is different from the second-type event. As such, the built-in camera on the electronic apparatus can be used for texture acquisition in addition to the picture acquisition. That is, the same camera can perform multiple functions.

Figure 2:
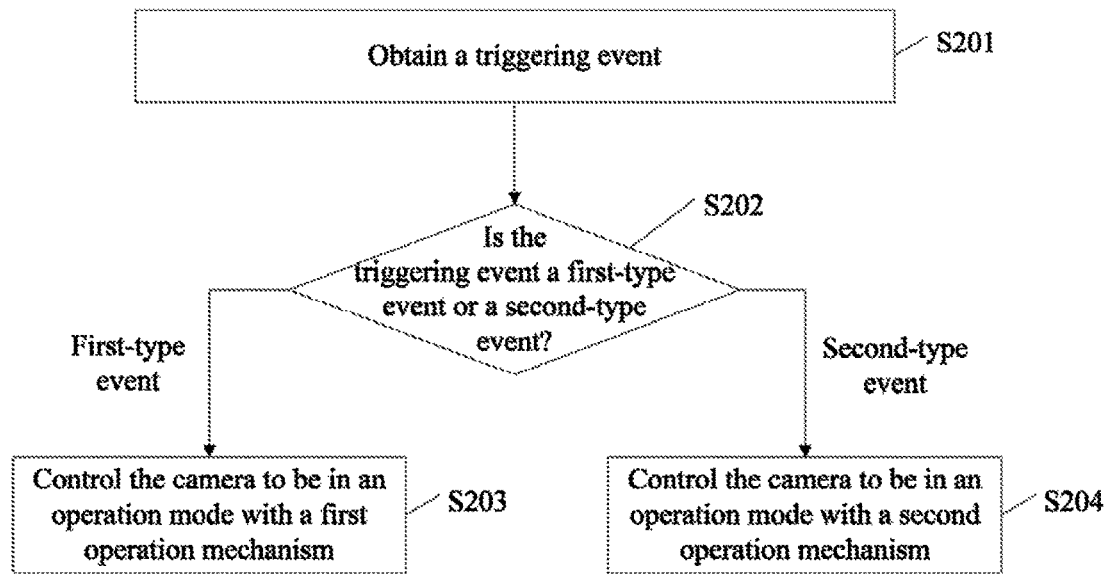
FIG. 2 is a flow chart of another example of camera operation mode control method consistent with embodiments of the disclosure.

FIG. 2 is a flow chart of another example of camera operation mode control method consistent with some embodiments. The method can be implemented in, for example, an electronic apparatus including at least one built-in camera. In some embodiments, a processor, e.g., a central processing unit or a camera controller, of the electronic apparatus can perform the method by executing program codes. The program codes can be stored in a memory, e.g., a non-transitory computer-readable storage medium. The electronic apparatus can include at least the processor and the memory.

As shown in FIG. 2, at S201, a triggering event is obtained. At S202, whether the triggering event is a first-type event or a second-type event is determined to obtain a determination result. At S203, if the determination result indicates that the triggering event is the first-type event, the camera is controlled to be in an operation mode with a first operation mechanism. At S204, if the determination result indicates that the triggering event is the second-type event, the camera is controlled to be in an operation mode with a second operation mechanism. The first operation mechanism is different from the second operation mechanism.

In some embodiments, the operation mechanism refers to one or more values of parameters during the operation of the camera, such as, for example, whether a white balance is applied, whether a flash is used, a resolution of the acquisition (acquisition resolution), a focal length, whether optical zooming or digital zooming is applied, and an accuracy of the acquisition (acquisition accuracy). In some embodiments, the camera can operate with two operation mechanisms, i.e., the first operation mechanism and the second operation mechanism. The first operation mechanism corresponds to one set of values of operation parameters and the second operation mechanism corresponds to another set of values of the operation parameters. Hereinafter, values of operation parameters are also referred to as "operation parameter values."

In some embodiments, controlling the camera to be in the operation mode with the first operation mechanism when the triggering event is the first-type event (S203 in FIG. 2) includes, if the triggering event is the first-type event, searching locally for operation parameter values of the first operation mechanism corresponding to the first-type event, and controlling the camera to capture a texture image according to the operation parameter values of the first operation mechanism.

In some embodiments, controlling the camera to be in the operation mode with the second operation mechanism when the triggering event is the second-type event (S204 in FIG. 2) includes, if the triggering event is the second-type event, searching locally for operation parameter values of the second operation mechanism corresponding to the second-type event, and controlling the camera to capture a texture image according to the operation parameter values of the second operation mechanism.

In some other embodiments, controlling the camera to be in the operation mode with the second operation mechanism when the triggering event is the second-type event (S204 in FIG. 2) includes, if the triggering event is the second-type event, searching locally for the operation parameter values of the second operation mechanism corresponding to the second-type event, and controlling the camera to capture an object image according to the operation parameter values of the second operation mechanism.

In some embodiments, correspondence information can be preset, which indicates the correspondences between triggering events and operation mechanisms. Lower level information of each operation mechanism includes the operation parameter values of the operation mechanism.

In some embodiments, obtaining the triggering event includes monitoring whether the account login event has occurred and, if so, obtaining the first-type event. In some other embodiments, obtaining the triggering event includes detecting a camera-starting operation performed by the user and, in response to the camera-starting operation, obtaining the second-type event.

Figure 3:
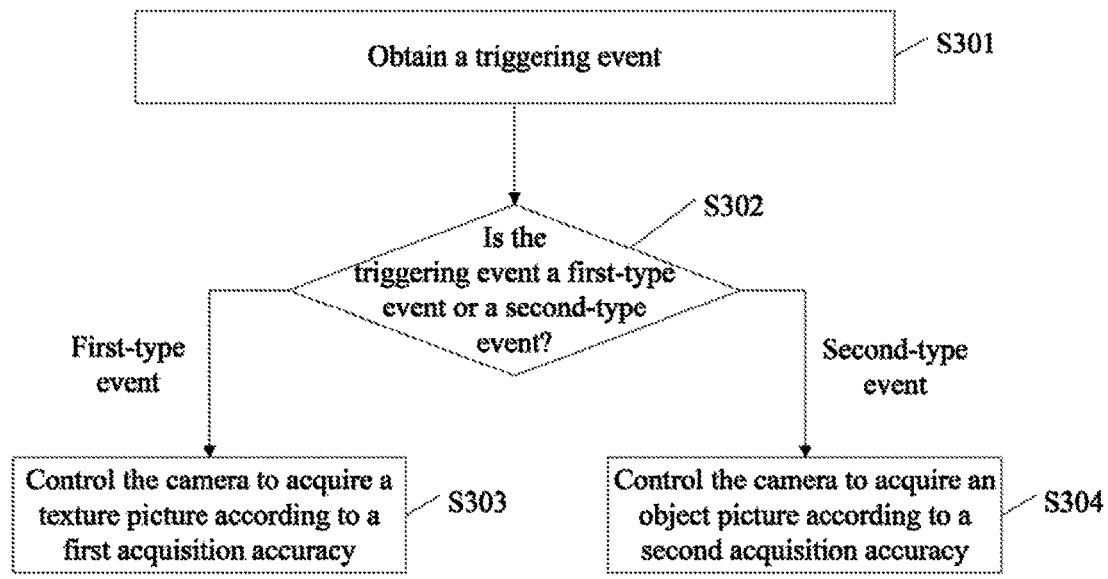
FIG. 3 is a flow chart of another example of camera operation mode control method consistent with embodiments of the disclosure.

FIG. 3 is a flow chart of another example of camera operation mode control method consistent with some embodiments. The method can be implemented in, for example, an electronic apparatus including at least one built-in camera. In some embodiments, a processor, e.g., a central processing unit or a camera controller, of the electronic apparatus can perform the method by executing program codes. The program codes can be stored in a memory, e.g., a non-transitory computer-readable storage medium. The electronic apparatus can include at least the processor and the memory.

In the example shown in FIG. 3, the operation parameter corresponding to the operation mechanism includes the acquisition accuracy. The acquisition accuracy when the camera is in an operation status with the first operation mechanism is higher than the acquisition accuracy when the camera is in an operation status with the second operation mechanism.

As shown in FIG. 3, at S301, a triggering event is obtained. At S302, whether the triggering event is a first-type event or a second-type event is determined to obtain a determination result. At S303, if the determination result indicates that the triggering event is the first-type event, a first acquisition accuracy corresponding to the first operation mechanism is obtained and the camera is controlled to acquire a texture image according to the first acquisition accuracy. At S304, if the determination result indicates that the triggering event is the second-type event, the camera is controlled to acquire an object image according to the second acquisition accuracy. The first acquisition accuracy is different from the second acquisition accuracy.

In some embodiments, obtaining the triggering event includes monitoring whether the account login event has occurred and, if so, obtaining the first-type event. In some other embodiments, obtaining the triggering event includes detecting a camera-starting operation performed by the user and, in response to the camera-starting operation, obtaining the second-type event.

In some embodiments, the operation parameter corresponding to the operation mechanism includes the acquisition distance. The acquisition distance when the camera is in an operation status with the first operation mechanism is shorter than the acquisition distance when the camera is in an operation status with the second operation mechanism. That is, when the camera is acquiring an object image, the camera takes the picture under a normal mode (the normal mode corresponds to a second acquisition distance), and when the camera is acquiring a texture image, the camera takes the texture image under a macro mode or a macro-macro mode (the macro or macro-macro mode corresponds to a first acquisition distance). The first acquisition distance is shorter than the second acquisition distance.

In some embodiments, during texture image acquisition, the user can place the object to be acquired (such as the user's finger, as shown in panel (b) of FIG. 1C) over the camera. The camera can adjust the acquisition accuracy automatically to obtain a clear texture image that satisfies certain requirements. The camera can also alternatively or additionally adjust a focal length of the camera to obtain the texture image using the focal length in the macro mode or the macro-macro mode.

In some embodiments, during the process of acquiring the texture image or the object image, the acquired texture image or the acquired object image can be displayed on a screen of the electronic apparatus. As such, the user can observe the texture image or the object image in real-time, which improves the sense of presence, and allows the user to adjust the camera whenever needed, such as changing the operation parameter values (acquisition parameter values) of the camera, to obtain a better texture image or a better object image.

In some embodiments, during the process of acquiring the texture image or the object image, it can be determined whether the acquired texture image or object image satisfies a preset condition. The preset condition corresponding to the texture image can be a first preset condition and the preset condition corresponding to the object image can be a second preset condition different from the first preset condition. If the texture image or the object image satisfies the corresponding preset condition, a first prompt message can be output to prompt the user that the acquisition is successful. If the texture image or the object image does not satisfy the corresponding preset condition, a second prompt message can be output to prompt the user that the acquisition has failed.

As described above, a method consistent with some embodiments can be implemented in a central processing unit or a camera controller of the electronic apparatus. In the embodiment below, an example of the method implemented in the camera controller is described. In the example described below, the first operation mechanism refers to extracting multiple feature points of a texture contained in an acquired texture image and sending the feature points to a first processing module corresponding to the first-type event. Further, the second operation mechanism refers to sending an acquired object image containing an object to a second processing module corresponding to the second-type event. In some embodiments, a module can correspond to an electronic circuit that is structured and/or wired to perform a certain function.

The first processing module can determine whether the acquired texture image satisfies a preset condition based on the feature points. In some embodiments, the first processing module can include an identification authentication module of the electronic apparatus. The identification authentication module can determine whether the acquired texture image is a texture image of a preset user based on the feature points. For example, the identification authentication module can determine whether the user currently attempting to log in corresponds to the finger print features of an authentic user. If so, the identification authentication module can output a first determination result indicating the current user is authentic. The electronic apparatus can also switch from a first interface (which is the current interface) to a second interface. The first interface can be an account login interface. In some embodiments, the account login interface can be displayed when an account login event is detected. On the other hand, if the user currently attempting to log in does not correspond to the finger print features of the authentic user, the identification authentication module can output a second determination result indicating the current user is not authentic.

In some embodiments, the method includes obtaining a triggering event, determining whether the triggering event is a first-type event or a second-type event to obtain a determination result, controlling the camera to be in an operation mode with a first operation mechanism if the triggering event is the first-type event, and controlling the camera to be in an operation mode with a second operation mechanism if the triggering event is the second-type event.

In some embodiments, the first operation mechanism refers to extracting multiple feature points of a texture contained in an acquired texture image and sending the feature points to a first processing module corresponding to the first-type event. That is, if the determination result indicates that the triggering event is the first-type event, the camera can be controlled to acquire a texture image. The camera controller can extract the feature points of the texture contained in the acquired texture image, and send the feature points to the first processing module corresponding to the first-type event.

In some embodiments, the second operation mechanism refers to sending an acquired object image containing an object to a second processing module corresponding to the second-type event. That is, if the determination result indicates that the triggering event is the second-type event, the camera can be controlled to acquire an object image. The camera controller can then send the object image containing the object to the second processing module corresponding to the second-type event.

As described above, an electronic apparatus consistent with some embodiments can be any suitable electronic apparatus having the information processing capability, such as a mobile phone, a tablet, a laptop, a personal computer, a personal digital assistant, a navigator, a digital phone, a video phone, or a television. An example of the camera operation mode control method consistent with some embodiments that is implemented in a laptop is described below. The laptop has a camera arranged on face C. Further, the laptop can operate in a tablet mode and a laptop mode. That is, the laptop can function as both a laptop and a tablet. When the laptop is used in the tablet mode, the laptop can be folded such that face A and face D of the laptop touch each other. In this situation, the camera on face C of the laptop can function in a similar manner as a rear camera on a mobile phone and can be used to capture object images. On the other hand, according to conventional technologies, when the laptop is in a state shown in FIG. 1C, the camera on face C is not used. That is, in the conventional technologies, the camera on face C is only used for photographing when the user switches the laptop to the tablet mode, and thus is not sufficiently used.

Consistent with some embodiments of the disclosure, the camera on face C of the laptop can be used in both modes. For example, in the laptop mode, the camera on face C can be used to acquire a texture image, e.g., a finger print picture, which can be used for account login. For example, the finger print picture can be analyzed and recognized, and be used for unlocking and logging in to Windows. In the tablet mode, the camera on face C can be used to acquire an object image. As such, the built-in camera of the electronic apparatus can be sufficiently used.

In some embodiments, the method includes acquiring a triggering event, determining an angle between face B and face C of the laptop, controlling an image acquisition component (such as the camera) on face C of the laptop to be in an operation mode with a first operation mechanism if the angle between face B and face C of the laptop is smaller than a preset angle, and controlling the image acquisition component on face C of the laptop to be in an operation mode with a second operation mechanism if the angle between face B and face C of the laptop is larger than or equal to the preset angle.

In some embodiments, the preset angle can be used to determine whether the laptop is in the laptop mode or the tablet mode. If the laptop is in the tablet mode, the image acquisition component on face C of the laptop can be controlled to be in the operation mode with the first operation mechanism. On the other hand, if the laptop is in the laptop mode, the image acquisition component on face C of the laptop can be controlled to be in the operation mode with the second operation mechanism. In some embodiments, the preset angle can be set to about 90° or about 120°. For example, if the angle between face B and face C of the laptop is smaller than about 120°, the laptop can be determined to be in the laptop mode, and the image acquisition component on face C of the laptop can be controlled to be in the operation mode with the first operation mechanism. If the angle between face B and face C of the laptop is larger than or equal to about 120°, the laptop can be determined to be in the tablet mode, and the image acquisition component on face C of the laptop can be controlled to be in the operation mode with the second operation mechanism.

In some embodiments, when the camera is working in the texture acquiring mode, the camera can be controlled to acquire one or more texture images. In some embodiments, each of the one or more texture images can be subject to an image recognition algorithm to obtain a characteristic value of contrast of the texture image, which can be used for further operation, such as logging in to a user account. e.g., a Windows account. In some embodiments, when a plurality of texture images can be obtained, the texture images can be processed, e.g., by averaging, to obtain a processed texture image, which can then be subject to the image recognition algorithm.

Figure 4:
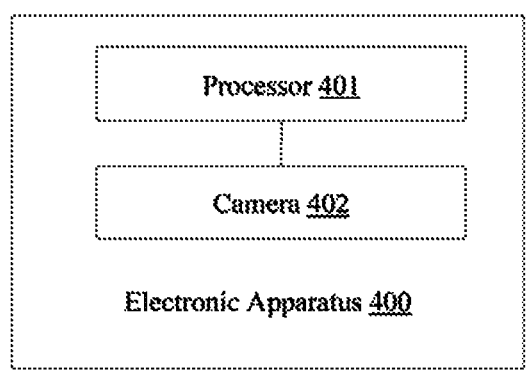
FIG. 4 is a structural diagram of an example of electronic apparatus consistent with embodiments of the disclosure.

FIG. 4 is a structural diagram of an example of electronic apparatus 400 consistent with some embodiments. As shown in FIG. 4, the electronic apparatus 400 includes a processor 401 and a camera 402.

The processor 401 can obtain a triggering event and control the camera 402 of the electronic apparatus 400 to be in an operation mode corresponding to the triggering event. If the triggering event is a first-type event, the processor 401 can control the camera 402 to be in a texture acquiring mode.

If the triggering event is a second-type event, the processor 401 can control the camera 402 to be in a picture acquiring mode. The first-type event and the second-type event are different from each other.

In some embodiments, if the triggering event is the first-type event, the processor 401 can control the camera 402 to be in an operation mode with a first operation mechanism. If the triggering event is the second-type event, the processor 401 can control the camera 402 to be in an operation mode with a second operation mechanism. The first operation mechanism is different from the second operation mechanism.

In some embodiments, an acquisition accuracy when the camera 402 is in an operation status with the first operation mechanism is higher than the acquisition accuracy when the camera 402 is in an operation status with the second operation mechanism.

In some embodiments, the first operation mechanism refers to extracting multiple feature points of a texture contained in an acquired texture image and sending the feature points to a first processing module corresponding to the first-type event. The second operation mechanism refers to sending an acquired object image containing an object to a second processing module corresponding to the second-type event.

In some embodiments, the processor 401 can obtain the triggering event by monitoring whether an account login event has occurred and, if so, obtaining the first-type event. In some embodiments, the processor 401 can obtain the triggering event by detecting a camera-starting operation performed by a user and, in response to the camera-starting operation, obtaining the second-type event.

In some embodiments, the electronic apparatus 400 is a laptop. The processor 401 can control the camera 402 of the electronic apparatus 400 to be in the operation mode corresponding to the triggering event by determining an angle between face B and face C of the laptop, controlling an image acquisition component (such as the camera 402) on face C of the laptop to be in the operation mode with the first operation mechanism if the angle between face B and face C of the laptop is smaller than a preset angle, and controlling the image acquisition component on face C of the laptop to be in the operation mode with the second operation mechanism if the angle between face B and face C of the laptop is larger than or equal to the preset angle.

The electronic apparatus 400 can be operated in manners similar to the method examples described above and can have similar effects, and thus detailed description thereof is omitted. One of ordinary skill in the art can understand the technical details that are not explicitly described by referring to the method examples described above, and thus detailed description thereof is omitted.

Figure 5:
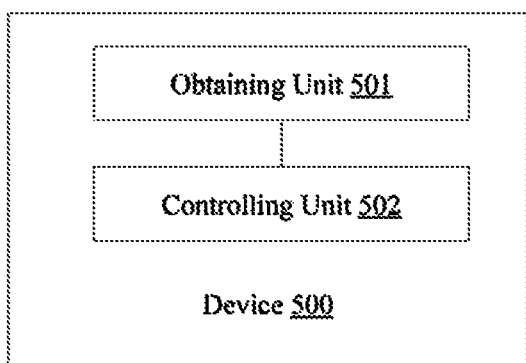
FIG. 5 is a structural diagram of an example of camera operation mode control device consistent with embodiments of the disclosure.

FIG. 5 is a structural diagram of an example of device 500 for controlling the operation mode of a camera of an electronic apparatus consistent with some embodiments. The device 500 includes an obtaining unit 501 and a controlling unit 502. The units and modules in each unit can be implemented in a processor or a camera controller of the electronic apparatus. In some embodiments, the units and modules can be implemented by specific logic circuits. In some embodiments, the processor can include, for example, a central processing unit (CPU), a micro processing unit (MPU), a digital signal processor (DSP), or a field-programmable gate array (FPGA).

Consistent with some embodiments of the disclosure, the obtaining unit 501 can obtain a triggering event, and the controlling unit 502 can control the camera of the electronic apparatus to be in an operation mode corresponding to the triggering event. If the triggering event is a first-type event, the controlling unit 502 can control the camera to be in a texture acquiring mode. If the triggering event is a second-type event, the controlling unit 502 can control the camera to be in a picture acquiring mode. The first-type event and the second-type event are different from each other.

In some embodiments, if the triggering event is the first-type event, the controlling unit 502 can control the camera to be in an operation mode with a first operation mechanism. If the triggering event is the second-type event, the controlling unit 502 can control the camera to be in an operation mode with a second operation mechanism. The first operation mechanism is different from the second operation mechanism.

In some embodiments, an acquisition accuracy when the camera is in an operation status with the first operation mechanism is higher than the acquisition accuracy when the camera is in an operation status with the second operation mechanism.

In some embodiments, the first operation mechanism refers to extracting multiple feature points of a texture contained in an acquired texture image and sending the feature points to a first processing module corresponding to the first-type event. The second operation mechanism refers to sending an acquired object image containing an object to a second processing module corresponding to the second-type event.

In some embodiments, the controlling unit 502 can obtain the triggering event by monitoring whether an account login event has occurred and, if so, obtaining the first-type event. In some embodiments, the controlling unit 502 can obtain the triggering event by detecting a camera-starting operation performed by a user and, in response to the camera-starting operation, obtaining the second-type event.

In some embodiments, the electronic apparatus is a laptop. The controlling unit 502 includes a determining module and a controlling module. The determining module can determine an angle between face B and face C of the laptop. The controlling module can control an image acquisition component (such as the camera) on face C of the laptop to be in the operation mode with the first operation mechanism if the angle between face B and face C of the laptop is smaller than a preset angle, and control the image acquisition component on face C of the laptop to be in the operation mode with the second operation mechanism if the angle between face B and face C of the laptop is larger than or equal to the preset angle.

The device 500 can be operated in manners similar to the method examples described above and can have similar effects, and thus detailed description thereof is omitted. One of ordinary skill in the art can understand the technical details that are not explicitly described by referring to the method examples described above, and thus detailed description thereof is omitted.

Figure 6:
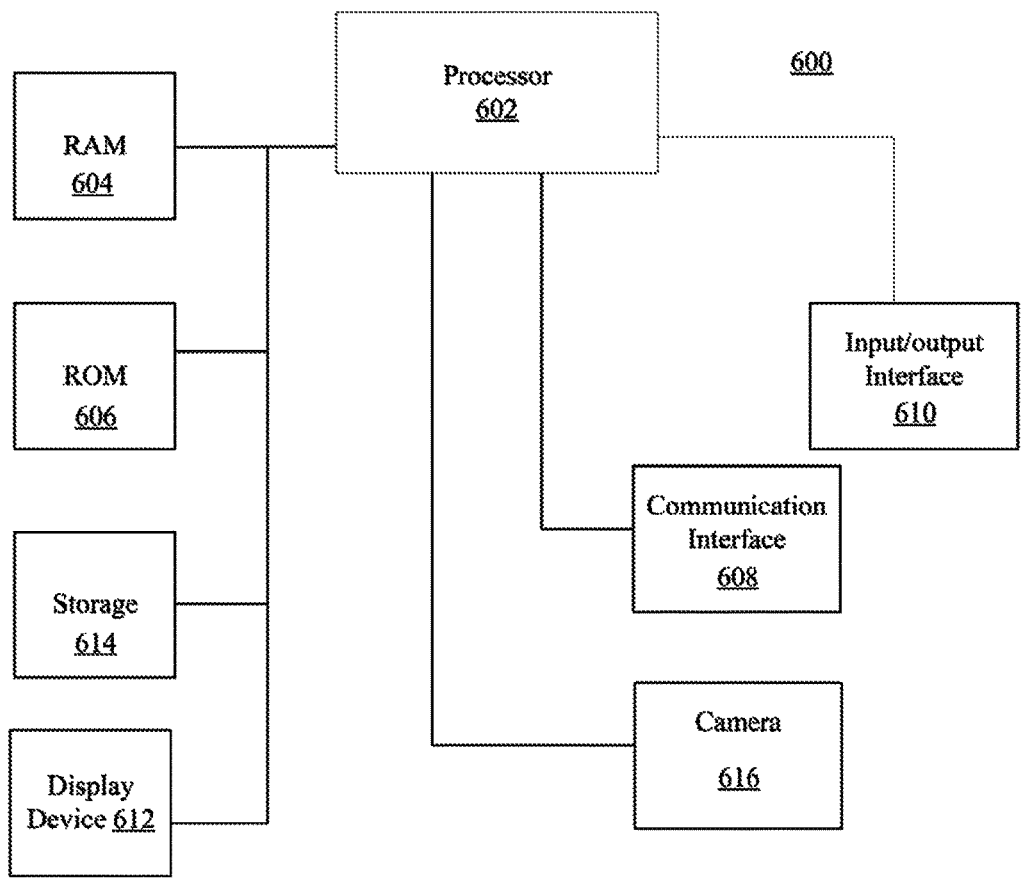
FIG. 6 is a structural diagram of another example of electronic apparatus consistent with embodiments of the disclosure.

FIG. 6 is a structural diagram of another example of electronic apparatus 600 consistent with embodiments of the disclosure. The electronic apparatus 600 may include one of a variety of apparatus that have an information processing capability, such as a mobile phone, a tablet computer, or a notebook computer, or any portable, pocket-sized, handheld, head-mounted, wearable, computer built-in, or vehicle mounted mobile device.

As shown in FIG. 6, the electronic apparatus 600 includes a processor 602, a random access memory (RAM) 604, a read only memory (ROM) 606, a communication interface 608, an input/output interface 610, a display device 612, a storage 614, and a camera 616. Any one or a combination of two or more of the RAM 604, the ROM 606, and the storage 614 can constitute a non-transitory computer-readable storage medium storing instructions that, when executed by the processor 602, cause the processor 602 to execute a method consistent with some embodiments, such as one of the above-described examples of camera operation mode control method. Other components may be added and certain components may be removed without departing from the principles of the disclosed embodiments.

The processor 602 may include, for example, a CPU, a graphic processing unit (GPU), a general purpose microprocessor, a DSP, a microcontroller, or an application specific integrated circuit (ASIC). The processor 602 may execute sequences of computer program instructions to perform various processes associated with the electronic apparatus 600, including a method consistent with some embodiments, such as one of the above-described examples of camera operation mode control method. The computer program instructions may be loaded into the RAM 604 for execution by the processor 602 from the ROM 606.

The communication interface 608 may provide communication connections such that the electronic apparatus 600 can be accessed remotely and/or communicate with other systems through computer networks or other communication networks via various communication protocols, such as transmission control protocol/internet protocol (TCP/IP), hypertext transfer protocol (HTTP), etc.

The input/output interface 610 may be provided for users to input information into the electronic apparatus 600 or for the users to receive information from the electronic apparatus 600. For example, the input/output interface 610 may include any appropriate input device, such as a remote control, a keyboard, a mouse, an electronic tablet, voice communication devices, or any other optical or wireless input devices. The input/output interface 610 may also include certain sensors, such as camera(s), eye-trackers, and other types of sensing components to input various user or environmental information to the electronic apparatus 600 for analysis and processing.

The display device 612 may include any appropriate display screen, such as a liquid-crystal display, a light-emitting diode display, a touch panel, or a projector. The display device 612 may be used to display the video images of the combined video file. The storage 614 may include any appropriate type of storage medium, such as a CD-ROM, a hard disk, a flash drive, an optical storage, a DVD drive, or other type of storage devices. During operation of the electronic apparatus 600, the processor 602 may perform certain information processing processes.

The camera 616 can be, for example, a built-in camera of the electronic apparatus 600, and can be controlled to operate in one of different operation modes as described above.

Figure 7:
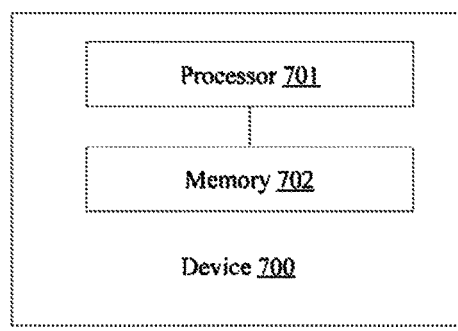
FIG. 7 is a structural diagram of another example of camera operation mode control device consistent with embodiments of the disclosure.

FIG. 7 is a structural diagram of another example of device 700 for camera operation mode control consistent with embodiments of the disclosure. As shown in FIG. 7, the device 700 includes a processor 701 and a memory 702 coupled to the processor 701. The memory 702 can store instructions that, when executed by the processor 701, cause the processor 701 to perform a camera operation mode controlling method consistent with some embodiments, such as one of the method examples described above. The memory 702 can include a non-transitory computer-readable storage medium, and can be, for example, a RAM, a ROM, a CD-ROM, a hard disk, a flash drive, an optical storage, or a DVD drive.

In the disclosure, the term "an embodiment" may include relevant features, structures, or characteristics that are not explicitly mentioned or described. Reference to, e.g., "an embodiment," "the embodiment," or "some embodiments," does not necessarily mean the same embodiment or embodiments. The features, structures, or characteristics can be combined as appropriate in one or more embodiments. The reference numerals used in the disclosure do not indicate or imply any particular sequence or order for executing the disclosed processes. The order of the processes should be determined based on their functions and internal logics.

Further, terms "include" and "comprise," and any other alternative forms of such terms, used in the disclosure intend to be nonexclusive. That is, a process, method, article, or device described as including certain elements does not only include the elements that are explicitly listed, but may also include other elements that are not explicitly listed or elements that are inherent to the process, method, article, or device. Other than being explicitly specified, an element following the phrase "including a" does not exclude the existence of another same element in the process, method, article, or device that includes the element.

The disclosed devices and methods can be implemented in other manners. The above-described servers and devices are merely examples. For example, different units may be defined merely according to their logical functions and can be defined according to a different manner. For example, multiple units or components can be combined or integrated into another system, or some features can be omitted or not executed. Further, the coupling, direct coupling, or communication connection between various components can be implemented by interfaces. The indirect coupling or communication connection between various devices or units can be electrical, mechanical, or another form.

Units described as separate components may or may not be physically separated from each other. A component described or shown as a unit may or may not be a physical unit. The units can be located in a same place or distributed on multiple network units. Some or all of the units can be chosen to realize purpose of the disclosure according to actual need.

Further, various functional units can be all integrated in one processing unit or be separate, individual units. Two or more units can be integrated in one unit. A unit can be implemented by hardware or by a combination of hardware and a computer application.

It is understood by persons of ordinary skill in the art that all or some of the processes consistent with some embodiments can be implemented by hardware as instructed by a program, which can be stored in a non-transitory computer-readable storage medium. The program, when executed, can cause, for example, a processor to perform a method consistent with some embodiments, such as one of the examples of the methods described above. The storage medium can include a medium that can store program codes, such as a mobile storage, a read only memory (ROM), a diskette, or a compact disc.

Further, functional modules for implementing a method consistent with some embodiments can be stored in a non-transitory computer-readable storage medium. Thus, part or all of the technical solutions consistent with some embodiments can be implemented as computer application product stored in a storage medium. The application product may include instructions that can cause computer equipment, such as a personal computer, a server, or network equipment, to perform part or all of a method consistent with some embodiments. The storage medium can include a medium that can store program codes, such as a mobile storage, a ROM, a diskette, or a compact disc.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A controlling method comprising:
   detecting a triggering event, the triggering event being one of a plurality of types of events, and the plurality of types of events including a first-type event and a second-type event that are different from each other; and
   controlling, based on the triggering event, a camera of a laptop including a first face and a second face to be in an operation mode corresponding to the triggering event as detected, including:
      determining an angle between the first face and the second face,
      controlling, in response to the angle being smaller than a preset angle, the camera to be in an operation mode with a first operation mechanism, and
      controlling, in response to the angle being larger than the preset angle, the camera to be in an operation mode with a second operation mechanism,
   wherein:
      a screen is arranged on the first face of the laptop,
      a keyboard and the camera are arranged on the second face of the laptop,
      the first-type event is a user authentication event corresponding to the angle being smaller than the preset angle and the operation mode with the first operation mechanism is a texture acquiring mode,
      the second-type event is a picture capturing event corresponding to the angle being larger than the preset angle and the operation mode with the second operation mechanism is a picture acquiring mode, and
      the picture acquiring mode is independent of the texture acquiring mode.

2. The method of claim 1 wherein:
   controlling the camera to be in the operation mode with the first operation mechanism includes controlling the camera to be in an operation mode that extracts a plurality of feature points of a texture in a texture image acquired by the camera and sends the feature points, and
   controlling the camera to be in the operation mode with the second operation mechanism includes controlling the camera to be in an operation mode that sends an object image containing an object that is acquired by the camera.

3. The method of claim 1, wherein detecting the user authentication event includes:
   monitoring whether an account login event has occurred, and
   determining, in response to detecting the account login event, the account login event as the user authentication event.

4. The method of claim 1, wherein detecting the picture capturing event includes:
   receiving the camera-starting operation performed by a user, and
   determining, in response to the camera-starting operation, the camera-starting operation as the picture capturing event.

5. The method of claim 1, wherein:
   controlling the camera to be in the texture acquiring mode includes controlling the camera to be in a macro acquisition mode, and
   controlling the camera to be in the picture acquiring mode includes controlling the camera to be in a normal acquisition mode.

6. The method of claim 1, wherein controlling the camera to be in the texture acquiring mode includes subjecting a texture image captured by the camera under the texture acquiring mode to an image recognition algorithm to obtain a characteristic value of contrast of the texture image.

7. The method of claim 1, wherein controlling the camera to be in the texture acquiring mode includes:
   controlling the camera to obtain a plurality of texture images under the texture acquiring mode,
   averaging the plurality of texture images to obtain a processed texture image, and
   subjecting the processed texture image to an image recognition algorithm to obtain a characteristic value of contrast of the processed texture image.

8. The method of claim 1, wherein:
   the texture acquiring mode has a first acquisition accuracy,
   the picture acquiring mode has a second acquisition accuracy, and
   the first acquisition accuracy is higher than the second acquisition accuracy.

9. A laptop comprising:
   a screen arranged on a first face of the laptop;
   a keyboard and a camera arranged on a second face of the laptop; and
   a processor coupled to the camera, the processor being operable:
      to detect a triggering event, the triggering event being one of a plurality of types of events, and the plurality of types of events including a first-type event and a second-type event that are different from each other, and
      to control, based on the triggering event, the camera to be in an operation mode corresponding to the triggering event, including:
         determining an angle between the first face and the second face,
         controlling, in response to the angle being smaller than a preset angle, the camera to be in an operation mode with a first operation mechanism, and
         controlling, in response to the angle being larger than the preset angle, the camera to be in an operation mode with a second operation mechanism,
      wherein:
         the first-type event is a user authentication event corresponding to the angle being smaller than the preset angle and the operation mode with the first operation mechanism is a texture acquiring mode,
         the second-type event is a picture capturing event corresponding to the angle being larger than the preset angle and the operation mode with the second operation mechanism is a picture acquiring mode, and
         the picture acquiring mode is independent of the texture acquiring mode.

10. The electronic apparatus of claim 9, wherein the processor is further operable:

to control the camera in the user authentication mode to extract a plurality of feature points of a texture in a texture image acquired by the camera and sends the feature points, and to control the camera in the picture capturing mode to send an object image containing an object that is acquired by the camera.

11. The electronic apparatus of claim 9, wherein the processor is further configured:

to monitor whether an account login event has occurred, and to determine, in response to detecting the account login event, the account login event as the user authentication event.

12. The electronic apparatus of claim 9, wherein the processor is further configured:

to receive the camera-starting operation performed by a user, and to determine, in response to the camera-starting operation, the camera-starting operation as the picture capturing event.

13. A controlling device comprising:

a processor; and a memory coupled to the processor and storing instructions that, when executed by the processor, cause the processor to:

detect a triggering event, the triggering event being one of a plurality of types of events, and the plurality of types of events including a first-type event and a second-type event that are different from each other, and control, based on the triggering event, a camera of a laptop including a first face and a second face to be in an operation mode corresponding to the triggering event, including:

determining an angle between the first face and the second face, controlling, in response to the angle being smaller than a preset angle, the camera to be in an operation mode with a first operation mechanism, and controlling, in response to the angle being larger than the preset angle, the camera to be in an operation mode with a second operation mechanism, wherein:

a screen is arranged on the first face of the laptop, a keyboard and the camera are arranged on the second face of the laptop, the first-type event is a user authentication event corresponding to the angle being smaller than the preset angle and the operation mode with the first operation mechanism is a texture acquiring mode, the second-type event is a picture capturing event corresponding to the angle being larger than the preset angle the operation mode with the second operation mechanism is a picture acquiring mode, the picture acquiring mode is independent of the texture acquiring mode.

\* \* \* \* \*